United States Patent
Hamann et al.

(10) Patent No.: US 8,630,724 B2
(45) Date of Patent: Jan. 14, 2014

(54) MEASUREMENT AND MANAGEMENT TECHNOLOGY PLATFORM

(75) Inventors: Hendrik F. Hamann, Yorktown Heights, NY (US); Jon Lenchner, Hawthorne, NY (US); Andrew Stepanchuk, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 12/540,101

(22) Filed: Aug. 12, 2009

(65) Prior Publication Data

US 2011/0040392 A1 Feb. 17, 2011

(51) Int. Cl.
G05B 13/02 (2006.01)
(52) U.S. Cl.
USPC .............................. 700/31; 700/12; 700/276
(58) Field of Classification Search
USPC ............. 700/12, 29–31, 90, 276, 278
See application file for complete search history.

(56) References Cited

U.S. PATENT DOCUMENTS

| 7,366,632 | B2 | 4/2008 | Hamann et al. |
| 2007/0078635 | A1* | 4/2007 | Rasmussen et al. ............ 703/1 |
| 2008/0288193 | A1 | 11/2008 | Claassen et al. |
| 2009/0012633 | A1* | 1/2009 | Liu et al. ........................ 700/90 |
| 2009/0149972 | A1* | 6/2009 | Nasle ............................ 700/80 |
| 2009/0326884 | A1 | 12/2009 | Amemiya et al. |
| 2010/0076607 | A1* | 3/2010 | Ahmed et al. ................ 700/276 |
| 2010/0286955 | A1* | 11/2010 | VanGilder et al. ........... 702/182 |
| 2011/0040529 | A1 | 2/2011 | Hamann et al. |

* cited by examiner

*Primary Examiner* — Mohammad Ali
*Assistant Examiner* — Nathan Laughlin
(74) *Attorney, Agent, or Firm* — Vazken Alexanian; Michael J. Chang, LLC

(57) ABSTRACT

Techniques for implementing system best practices are provided. In one aspect, a method for monitoring, modeling and managing a physical system is provided. The method includes the following steps. A physical data model of the physical system is provided. Real time data is obtained from the physical system. The physical data model is updated based on the real time data. An analytic model of the physical system is created based on the updated physical data model. Operation of the physical system is controlled based on output from the analytic model.

19 Claims, 13 Drawing Sheets

100

400

500

600

700

800

900

1200

1300

MEASUREMENT AND MANAGEMENT TECHNOLOGY PLATFORM

REFERENCE TO APPENDIX DATA

This application includes a computer program listing appendix in electronic format. The computer program listing appendix is provided as a file entitled ComputerProgramListingAppendix.txt, created on Sep. 22, 2013, which is 57,434 bytes in size. The information in the electronic format of the computer program listing appendix is incorporated by reference, in its entirety, herein.

FIELD OF THE INVENTION

The present invention relates to techniques for implementing system best practices, and more particularly, to monitoring, modeling and managing physical systems and their underlying physical processes.

BACKGROUND OF THE INVENTION

When dealing with physical systems, such as buildings, assemblies of buildings, a campus of buildings, cities, water networks, data centers, etc., it is important to be able to understand and characterize the physical processes such as air flow, water flow (including the flow of contaminants), power consumption, power generation, associated therewith. There exist in the market a vast number of products for the monitoring of physical systems and processes, typically providing a system operator with a dashboard style snapshot of what is happening to the physical systems of interest so that actions can be taken, either manually, or through some automated means, e.g., enabling automated shutdown when a process is running too "hot." Tivoli Monitoring from International Business Machines Corporation is a popular monitoring platform of this kind which is typically used to monitor information technology (IT) devices and facilities type equipment (such as air conditioning and power distribution units) in data centers.

Additionally, there are numerous products available for modeling of physical processes, be they the flow of air in data centers, the flow of water in surface or ground water systems, or the flow of airborne or waterborne contaminants. The flow of such systems is governed by the Navier-Stokes equations and there are a variety of numerical solvers available for these equations. Some of these solvers are completely generic and some are geared to specific applications. Those geared to specific applications try to alleviate the need for the user to know anything about the underlying mathematics of the solvers, choosing to frame the input in terms that are more familiar to the target user population. Lists of freely available generic and application-specific computational fluid dynamics (CFD) solvers are readily available on the World Wide Web.

Finally, there are various applications for managing physical systems. For example, various building management systems (BMS) allow for the managing of a building's heating ventilation and air conditioning (HVAC) systems. Sometimes these management systems incorporate a certain amount of monitoring capability, though none incorporate sensed data from third party sensors or other monitoring devices, and most importantly, none incorporate theoretical or numerical modeling of the underlying physical processes being monitored or managed.

Therefore techniques that enable the integrated and coordinated use of physical modeling and management, especially at the building and data center level would be desirable.

SUMMARY OF THE INVENTION

The present invention provides techniques for implementing system best practices. In one aspect of the invention, a method for monitoring, modeling and managing a physical system is provided. The method includes the following steps. A physical data model of the physical system is provided. Real time data is obtained from the physical system. The physical data model is updated based on the real time data. An analytic model of the physical system is created based on the updated physical data model. Operation of the physical system is controlled based on output from the analytic model.

In another aspect of the invention, a platform for monitoring, modeling and managing a physical system is provided. The platform includes a data model builder configured to build a data model of the physical system; a real time data manager configured to obtain real time data from the physical system; a physical model manager configured to update the model based on the real time data; an analytic model manager configured to create an analytic model of the physical system based on the updated data model; and a control manager configured to control operation of the physical system based on output from the analytic model.

A more complete understanding of the present invention, as well as further features and advantages of the present invention, will be obtained by reference to the following detailed description and drawings.

DETAILED DESCRIPTION OF PREFERRED EMBODIMENTS

Figure 1:
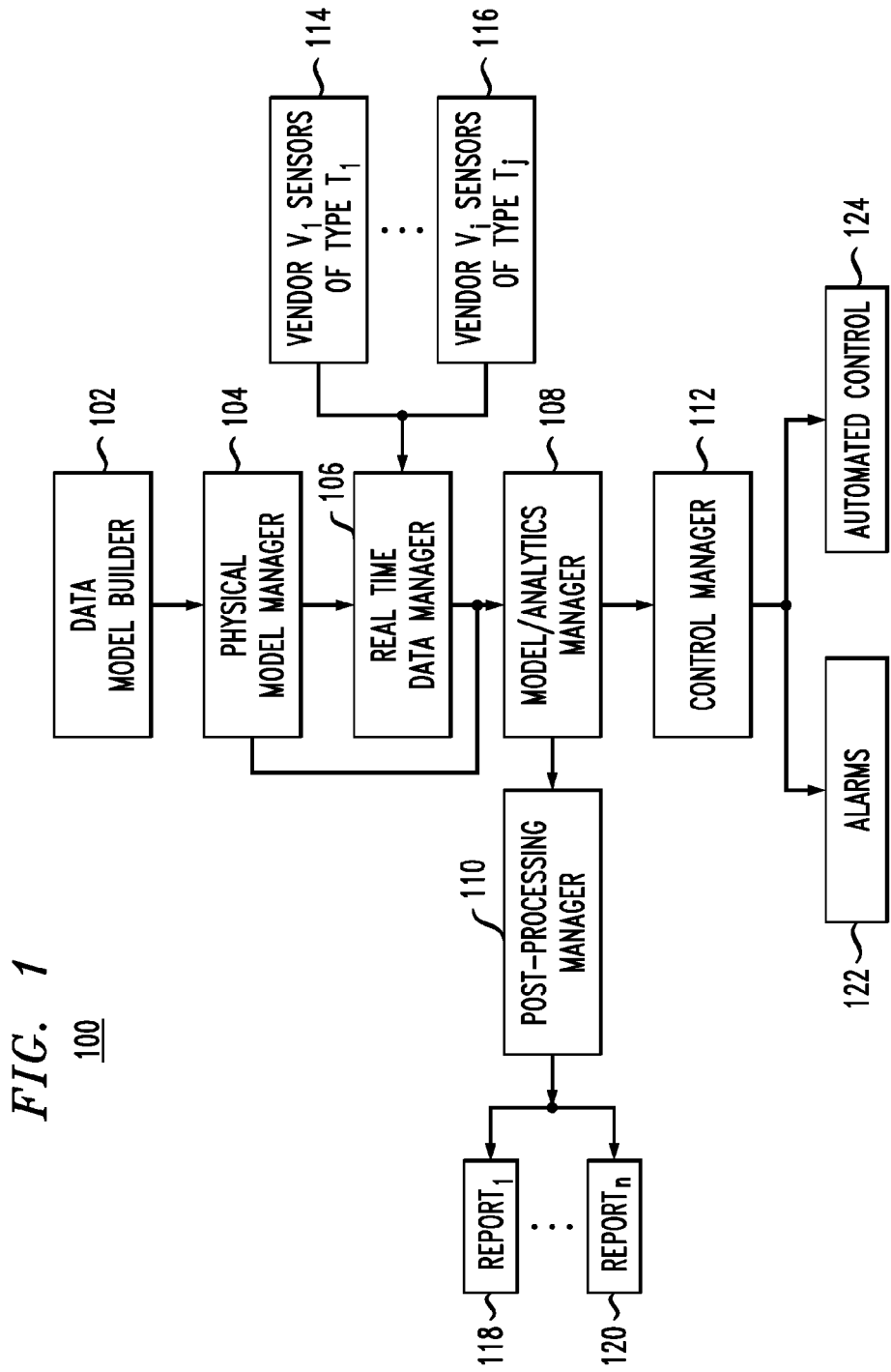
FIG. 1 is a diagram illustrating an exemplary measurement and management technology (MMT) platform according to an embodiment of the present invention.

Disclosed herein are techniques for monitoring, modeling and managing physical systems and their underlying physical processes. Examples of these physical systems might include buildings, assemblies of buildings, a campus of buildings, cities, water networks and also data centers. The physical process being monitored, modeled and managed might include air flow, water flow (including the flow of contaminants), power consumption, power generation, and so forth. Thus, the present techniques can be used for managing data centers, intelligent buildings (IB) or cities (IC) or even water.

The present techniques enable a novel functionality, which will uniquely allow the management and modeling of physical systems using real-time data. While there are software solutions, which allow modeling and post-processing of physical systems, this technology further enhances existing technologies by leveraging real time data feeds—literally benchmarking these models with actual measurement data. In addition, the present techniques leverage a suite of modeling techniques, which lend themselves to leveraging actual measurement data as described below.

In this description, for illustration purpose only, the example of air flow in a data center is used but it is noted that this technology platform can be applied to many physical systems as outlined above. By way of example only, the same present technology platform can also be used to model the flow of ground or surface water, or the flow of contaminants in air, as well as in ground or surface water. The physics equations governing the flow of all fluids, be they gases or liquids, are the same Navier-Stokes equations. Contaminant transport in such fluidic systems is again governed by the Navier-Stokes equations, but this transport is normally considered as having two distinct components, an advective component, where the flow of the contaminants is governed by the main stream flow, and a dispersive component, where the flow of the contaminants is governed by the gradual tendency of all such systems to disperse or become more diluted with time. The upshot is that rather than one set of Navier-Stokes equations, in the case of contaminant transport, there are two coupled sets of such equations. In all cases, there are boundary conditions that must be specified, and the present measurement and management technology (MMT) platform allows for the graphical specification of such boundary conditions. In the case of a data center, these boundary conditions consist of walls and complex internal no-flow boundaries, coupled with specified sinks and sources where information technology (IT) and facilities devices respectively either take in air or emit air into the environment (sometimes emitting cooled air and sometimes emitting exhaust air). In the case of a ground water system, the aquifer boundary constitutes a no-flow (or possibly a reduced flow) boundary and there may be additional locations where artesian conditions or man-made wells act as sources or sinks. Analogous considerations apply when modeling surface water flow.

Just like in data centers where the notion of types, elements and properties are described herein, there are analogous examples in the case, for example, of surface water systems. With regard to modeling flow along a river, sample types might be dams, water-inflow-source or water-outflow-source. Subtypes of water-inflow-source might be stream, rainfall or sewage-treatment-plant. The elements associated with these types are, e.g., the individual feeding streams, and sample properties, say of a stream, are average-flow-rate, min-flow-rate and max-flow-rate.

Just like in a data center, where one may be interested in visualizing temperature distribution and flow rates, the same properties are often visualized in water flow studies. When the flow of air in a data center is modeled the objective is to take action to optimize/minimize the use of cooling energy while keeping the equipment functioning correctly. In groundwater and surface water systems, similar actions can be taken. Water is also a limited resource and it is important to manage it efficiently. Expeditious use of the model allows one, for example, to know when it is best to prevent an untimely sewage discharge, or where to drill a well for drinking water purposes, and how many cubic feet per minute that well will support.

An actual implementation of the present techniques was realized in JAVA, which is OS agnostic. This MMT platform consist of various components, which are discussed in the following in more detail.

FIG. 1 is a diagram illustrating MMT platform 100. MMT platform 100 includes data model builder 102, physical model manager 104, real time data manager 106, analytic model manager 108, post-processing manager 110 and control manager 112. Data model builder 102 is used to build a model of a physical system and allows a user to specify elements of the data model and their attributes using a hierarchy of data types. The data model builder, as well as elements and data types included therein, are described in further detail below. The data model is ultimately expressed in extensible markup language (xml) and the system may include either a graphical or text based xml editor. In general, a data model is a way to describe/represent a physical system. Ideally one data model would be created for water management or data center energy management, etc. A physical model manager allows the user to change the value of some of the attributes or properties of the elements of the data model. For each data center there would be a different set of values, etc. It is notable that some of the values will be updated or changed in real time using the real time manager. The physical model provides a calculation, for example, the total power consumption of the physical system (e.g., which would be obtained here by just adding up the power consumption of the racks, see below).

For ease of description, a data center will be used herein as an exemplary physical system. However it is to be understood that the present techniques are broadly applicable to any physical system, including, but not limited to buildings, assemblies of buildings, a campus of buildings, cities, water networks, as well as data centers. For reference, an exemplary data center is provided in FIG. 2, described below.

Once the data model is built by data model builder 102, the user can specify the physical locations of objects in the physical system using physical model manager 104. The physical model manager is a graphical user interface (GUI) component which allows the user to build up a software model of the physical system by placing elements from a pallet of elements and attributes of these elements, as specified above. The physical model manager is described in further detail below.

Once the location and other properties of objects are specified, including sensors (see below), the next component of MMT platform 100, real time data manager 106 which takes the output of physical model manager 104 as its input, can do its work. According to an exemplary embodiment, the real time data manager has pre-built adapters to accept various types of sensors from various types of vendors, portrayed in FIG. 1 as entities 114 to 116. For example, in the context of a data center, the sensor types may include temperature sensors, air flow sensors, humidity sensors and so forth. A large number of different vendors provide these sensors, and MMT platform 100 can have adaptors to work with them. The real time data manager is described in further detail below. Pre-built adapters are generally known to those of skill in the art. In essence a pre-built adapter is simply an interface to allow for data feeds which could include even RSS feeds from the internet. Another adapter could be a hypertext transfer protocol (http) post request whereby sensor data is requested from another device on the internet (such as a web server).

Once sensors are hooked into the system through real time data manager 106, and physical model manager 104 has been used to create a high fidelity model, the analytic model manager 108 can be used to incorporate theoretical and/or numerical models to understand the present state of the physical system and make predictions about its future evolution. If air or water flow processes are being modeled, typically a computational fluid dynamics solver is incorporated at this point. Also, various secondary analytics may be performed by the analytic model manager, for example in data centers or generic buildings, to understand where hot and cold spots may be, or to understand the efficiency of air conditioning units. The analytic model manager will be described in further detail below.

The output of the model/analytics manager is then fed into post-processing manager 110 to generate various reports 118-120 or sent to control manager 112 to offer various types of feedback control, either, for example, by providing alarms 122 or allowing for automated control 124. The post-processing manager and the control manager will be described in further detail below.

Figure 2:
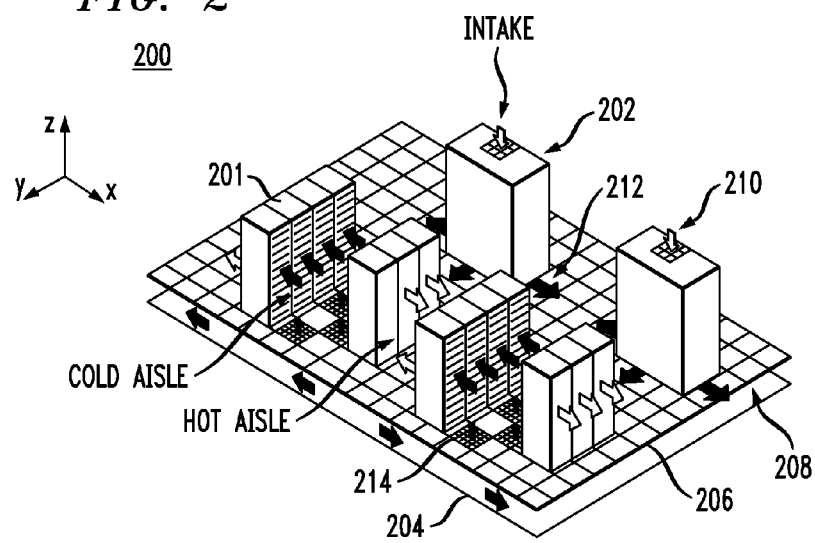
FIG. 2 is a diagram illustrating an exemplary data center according to an embodiment of the present invention.

FIG. 2 is a diagram illustrating exemplary data center 200. Data center 200 has server racks 201 and a raised-floor cooling system with air conditioning units (ACUs) 202 that take hot air in (typically from above through one or more air returns in the air conditioning units) and exhaust cooled air into a sub-floor plenum below. Hot air flow through data center 200 is indicated by light arrows 210 and cooled air flow through data center 200 is indicated by dark arrows 212.

In FIG. 2, server racks 201 use front-to-back cooling and are located on raised-floor 206 with sub-floor 204 beneath. Namely, according to this scheme, cooled air is drawn in through a front (inlet) of each rack and warm air is exhausted out from a rear (outlet) of each rack. The cooled air drawn into the front of the rack is supplied to air inlets of each server therein. Space between raised floor 206 and sub-floor 204 defines the sub-floor plenum 208. The sub-floor plenum 208 serves as a conduit to transport, e.g., cooled air from the air conditioning units 202 to the racks. In a properly-organized data center (such as data center 200), racks 201 are arranged in a hot aisle—cold aisle configuration, i.e., having air inlets and exhaust outlets in alternating directions. Namely, cooled air is blown through perforated floor tiles 214 (also referred to as vents) in raised-floor 206, from the sub-floor plenum 208 into the cold aisles. The cooled air is then drawn into racks 201, via the air inlets, on an air inlet side of the racks and dumped, via the exhaust outlets, on an exhaust outlet side of the racks and into the hot aisles.

The air conditioning units typically receive chilled water from a refrigeration chiller system (not shown). Each air conditioning unit typically comprises a blower motor to circulate air through the air conditioning unit and to blow cooled air, e.g., into the sub-floor plenum. As such, in most data centers, the air conditioning units are simple heat exchangers mainly consuming power needed to blow the cooled air into the sub-floor plenum. Typically, one or more power distribution units (PDUs) (not shown) are present that distribute power to the server racks 201.

The components of MMT platform 100 (of FIG. 1) will now be described in detail.

Data Model Builder: The present techniques allow for building physical models of physical systems, and include means to interactively update such a data model, e.g., adding and/or altering types and properties of the data model. In essence, the data model is being built up dynamically and does not involve a software developer.

Using the example of a data center, "types" could include server racks, storage devices, servers, walls, air conditioning units etc. These different types will have "properties." For example, a server could include properties of its physical dimensions, rack power and air flow. An air conditioning unit type could include a property such as cooling capacity. The model consists of different "elements" which are particular instances of types. For example, a rack might be a type, but each particular rack would be an element. So when looking at the rack type in the model, one sees a list of properties for that type, however when looking at the rack element, one sees a list of the individual racks. Thus, in general, each element is associated with a type and each type is associated with different properties. More generally, a hierarchy of types may be defined, so that, for example, an air conditioning unit might be defined as a sub-type of the more generic cooling equipment, which in turn might be a sub-type of the more generic equipment. An exemplary implementation of the MMT platform wherein a new type is created is presented in FIGS. 4 and 5, described below.

Model Manager: The model manager includes means to manage the model of the physical system. In one exemplary embodiment, the model manager may contain a graphical layout editor, where a user can interactively update the models such as by adding, deleting, moving and/or reconfiguring elements of the model. As described above, an element is associated with a specific type. Each type has associated properties. For example, the model manager contains a layout editor, where the user can interactively update the model by adding new elements. For example, new sensors could be added and/or sensors can be moved (see description of sensors above). Sensors may be added, for example, if a new server gets added to the data center. Alternatively, if an older server is retired, the sensors which are attached to that older server may be removed.

Also, by way of example only, server racks may be moved to different locations in a data center, and similarly server racks may be added or removed from a data center. The user can implement such a change via the model manager to update the model so as to reflect this configuration change. In one exemplary embodiment, the model manager allows users to copy and paste elements, interactively move these elements and fill in property values of respective elements using tables and spreadsheets. Thus, using the above example of a server rack being added to a data center, the user can simply copy one of the existing server racks and then paste a copy of the server rack in the location of the new rack. The properties of the copied rack will be automatically associated with the new rack, but can be edited via the model manager.

Further, as will be described in detail below, the model manager may also receive real time, or near real time data via the real time data manager and as a result update the data model accordingly. By way of example only, if the real time data manager receives air temperature data for a server rack(s) in a data center, the model manager can update the properties of the corresponding server element(s) in the model.

The model manager might be synchronized with other data sources. For example, in the case of a data center, the model manager may be fed from an asset management database, where all the IT assets are stored. Assets are, for example, servers, air conditioning units, etc. Basically, the model manager can be synchronized with an already existing asset management system. In the case that a new server gets added to an asset management system, an adapter would inform the model manager.

The conversion from the asset management database to the MMT platform data model is part of the model manager. An exemplary implementation of the model manager is presented for example in FIG. 6, described below.

The model manager might also include bar code reader capabilities. For example, the bar code of a physical asset can be read with the model manager automatically filling in information about the asset and its properties. A physical asset is an element. In other words a physical asset is an instance of a type. The model manager provides means to specify the physical location of the asset. For example, an asset can be scanned using a bar code reader. That asset has some properties, which may or may not be in some asset management data base. Once scanned in, the asset (such as a server) shows up on the MMT client GUI (which is part of the model manager). The asset can be taken and dragged to its correct location.

The model manager also contains means to look at historical views of the model. For example, as a data center changes the user can go back in time and bring up past model representations. Specifically, each configuration or model is stored with a timestamp. In the case that a data center operator wants to look back and retrieve a configuration from the past then it can be uploaded.

Real time Data Manager: The MMT platform includes means to obtain real time data and to use that data to update the model. The fact that the MMT platform allows for real time data feeds and dynamic modeling capabilities is a clear advantage of the present techniques over conventional processes. The real time data manager might include a feeder, or agent, which can send real time or near-real time data, e.g., over the internet. The difference between "real time" and "near-real time" can be defined, for example, by the network latency (i.e., it will take a few milliseconds (ms) to send the data). The feeder might consist of distributed services running at a variety of locations. In other words, individual sensors could send their data independently, or there could be a hub for distinct types of sensors and the hubs could individually send their data. For example, there could be a first hub for temperature sensors, a second hub for air flow sensors, and so forth. The real time data manager might be able to take advantage of RSS feeds and other data sources, which get regularly updated. The data is then received by the MMT platform and managed further by the real time data manager. The real time data manager links the streaming data with the model manager. For example, in one exemplary embodiment, the latest value of the real time data is displayed next to a sensor (see for example FIG. 12, described below) or asset for which this data point is associated. The real time data manager also manages the storage and archival of the data. The real time data can be used to update the model in a number of different ways. According to an exemplary embodiment, all data is forwarded into a database where each data set has a time stamp. The data can then be retrieved from the data base and plotted as a function of the timestamp.

Figure 3:
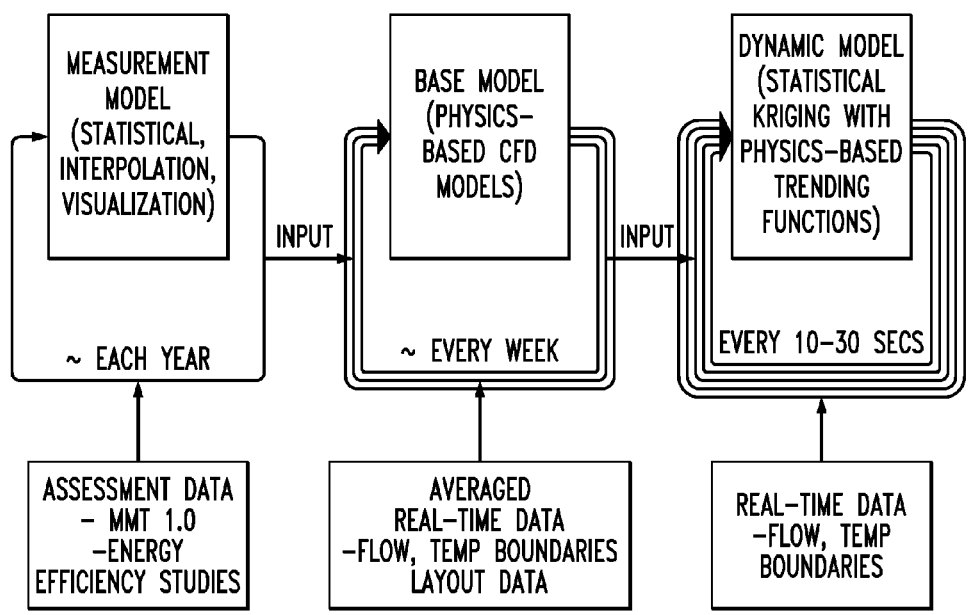
FIG. 3 is a diagram illustrating an exemplary measurement based dynamic (MBD) modeling architecture according to an embodiment of the present invention.

Analytic Model Manager: The MMT platform includes a model and analytics manager. In detail, the analytic model manager allows for the implementation and invocation of different types of analytic models (which can be physics-based models and also statistical models) based on the (updated) data model. The analytic model manager is preferably configured such that the MMT platform can most effectively respond to various changes in the physical system which naturally occur on different time scales. Thus, the analytic model manager might use a measurement based dynamic (MBD) modeling architecture, i.e., MBD modeling architecture 300, which is depicted in FIG. 3. Specifically, base models are generated from the measurements (or measurement models (MModels)). Often that may include an initial survey or detailed assessment. A detailed assessment (performed about once a year) may use data collected from mobile measurement technology (MMT) 1.0 and/or from energy efficiency studies. MMT 1.0 is described for example in U.S. Pat. No. 7,366,632, issued to Hamann et al., entitled "Method and Apparatus for Three-Dimensional Measurements" (hereinafter "U.S. Pat. No. 7,366,632") the contents of which are incorporated by reference herein. MMT 1.0 is a technology for optimizing data center infrastructures for improved energy and space efficiency which involves a combination of advanced metrology techniques for rapid measuring/surveying data centers (see, for example, U.S. Pat. No. 7,366,632) and metrics-based assessments and data-based best practices implementation for optimizing a data center within a given thermal envelope for optimum space and most-efficient energy utilization (see, for example, U.S. patent application Ser. No. 11/750,325, filed by Claassen et al., entitled "Techniques for Analyzing Data Center Energy Utilization Practices," the contents of which are incorporated by reference herein).

Updated base models (BModels) are generated if significant changes occur (e.g., in a data center if racks are moved, tiles are re-arranged etc.). BModels might require solving partial differential equations (PDEs) such as the ubiquitous Navier-Stokes equations that govern the flow of fluids (such as air and water) in porous media, which require longer (up to about one hour) but less frequent calculations (about each week). On the other hand, dynamic models (DModels) are generated with fast methodologies (from about 10 seconds to about 30 seconds) and are used for smaller changes in the data center (e.g., changes in server utilization, throttling fans, different cooling conditions), which occur more frequent. Both BModels and DModels can be furbished by real time data from the real time data manager. For a description of such models, see, for example, U.S. patent application Ser. No. 12/146,952, filed by Amemiya et al., entitled "Techniques to Predict Three-Dimensional Thermal Distributions in Real-Time," the contents of which are incorporated by reference herein. The model/analytics manager includes means to create a finite element mesh network. Such mesh networks may be required to solve partial differential equations. The model/analytics manager allows invoking different models, for example once a mesh is generated. See for example, U.S. patent application Ser. No. 12/540,034, filed by Hamann et al., entitled "Methods and Techniques for Creating and Visualizing Thermal Zones," the contents of which are incorporated by reference herein (which describes thermal zone modeling using a finite element mesh). Possible boundary conditions for this model can be obtained from the model manager as well as the real time data manager. The idea is to use a base, more dense sampling together with a model to more accurately interpolate across subsequent, more sparsely collected data. This technique can be used in water and air quality management and modeling where densely placed sensors can only be placed for a very short period of time.

One of the important aspects of the MMT technology is that it achieves very high precision in its model predictions despite obtaining ongoing readings from a relatively sparse set of static sensors. This high precision is achieved by supporting a methodology whereby a one-time dense sampling is done initially, and the subsequent, sparse sensor readings are incorporated to the high fidelity "big picture" obtained from the initial dense sampling. This methodology is important in data centers and other indoor environments, where one simply cannot place a high volume of static sensors since the sensors would block operations. In ground and surface water systems it is generally not even possible (or at least affordable) to place a dense set of static sensors, though one time relatively dense samples can be taken, e.g., by amphibious robotic means.

Post-processing Manager: The post-processing manager permits visualizing the analytic model results (i.e., by the user). For example, if a temperature distribution was calculated the post-processing manager allows for displaying/showing the calculated temperature distribution, or if a flow field was calculated the post-processing manager would allow for the display of the calculated flow field. The post-processing allows in one exemplary embodiment for displaying cross-sections of the physical system and includes two-dimensional and three-dimensional capabilities (e.g., a simple code can be used which translates the MMT data model to a VMRL data model) (see for example FIG. 14, described below). In one exemplary embodiment, the post-processing manager may provide a virtual display of the modeling and measurement data, for example using virtual reality modeling language (VRML) technology.

Preferably, each analytic model and model result has a time stamp. In the post-processing manager, past results can be readily viewed for each associated model. Other forms of post-processing may include visualization of cooling zones in a data center and/or efficiencies of these cooling zones as bar charts. An exemplary implementation of the post-processing manager is presented in FIG. 10, described below.

Control Manager: The control manager facilitates operational control of the system. In its simplest form the control manager can provide feedback, for example, regarding temperature hotspots in a data center. Namely, action of the control manager can be in response to an analytic model run by the analytic model manager. Thus, if the analytic model identifies several temperature hotspots in the data center, the control manager can effectuate a notification alerting the user. The control manager, in this example, comprises alarms using e-mail, instant messaging etc.

According to another exemplary embodiment, the control manager can actively control devices. For example, in the case of a data center, the speed of air conditioning unit fans might be controlled or the control manager might determine the set-points of air conditioning units, or when to bypass and turn off a chiller system. Alternatively, rather than taking control actions automatically, the control manager might recommend control actions or outline/suggest a set of best practices.

Figure 4:
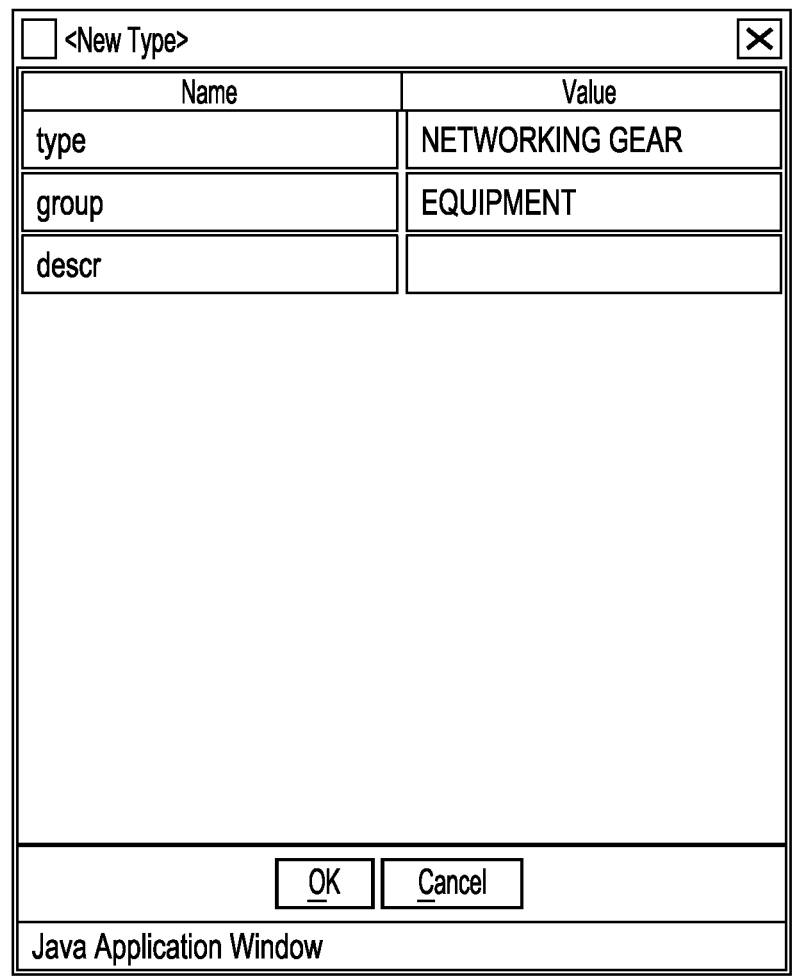
FIG. 4 is a diagram illustrating an exemplary user-accessible window in a data model builder for creating a new type according to an embodiment of the present invention.

An example of creating a new type in the data model builder is now provided. For example, FIG. 4 is a diagram illustrating an exemplary user-accessible window 400 in the data model builder for creating a new type, in this case for NETWORKING GEAR (e.g., a rack of routers), in the MMT platform. As shown in FIG. 4, NETWORKING GEAR (as a choice of the user) has been made part of the EQUIPMENT group (or "type") so it inherits properties that are common to all EQUIPMENT. One can then add properties using the graphical user interface (see, for example, FIG. 5, described below) of the MMT to give NETWORKING GEAR attributes (or properties, i.e., properties and attributes are used synonymously herein) that distinguish it from more generic EQUIPMENT. For example, in the case of a data center, only attributes that are associated with power consumption and air flow are essential, but one may freely enter additional properties.

Figure 5:
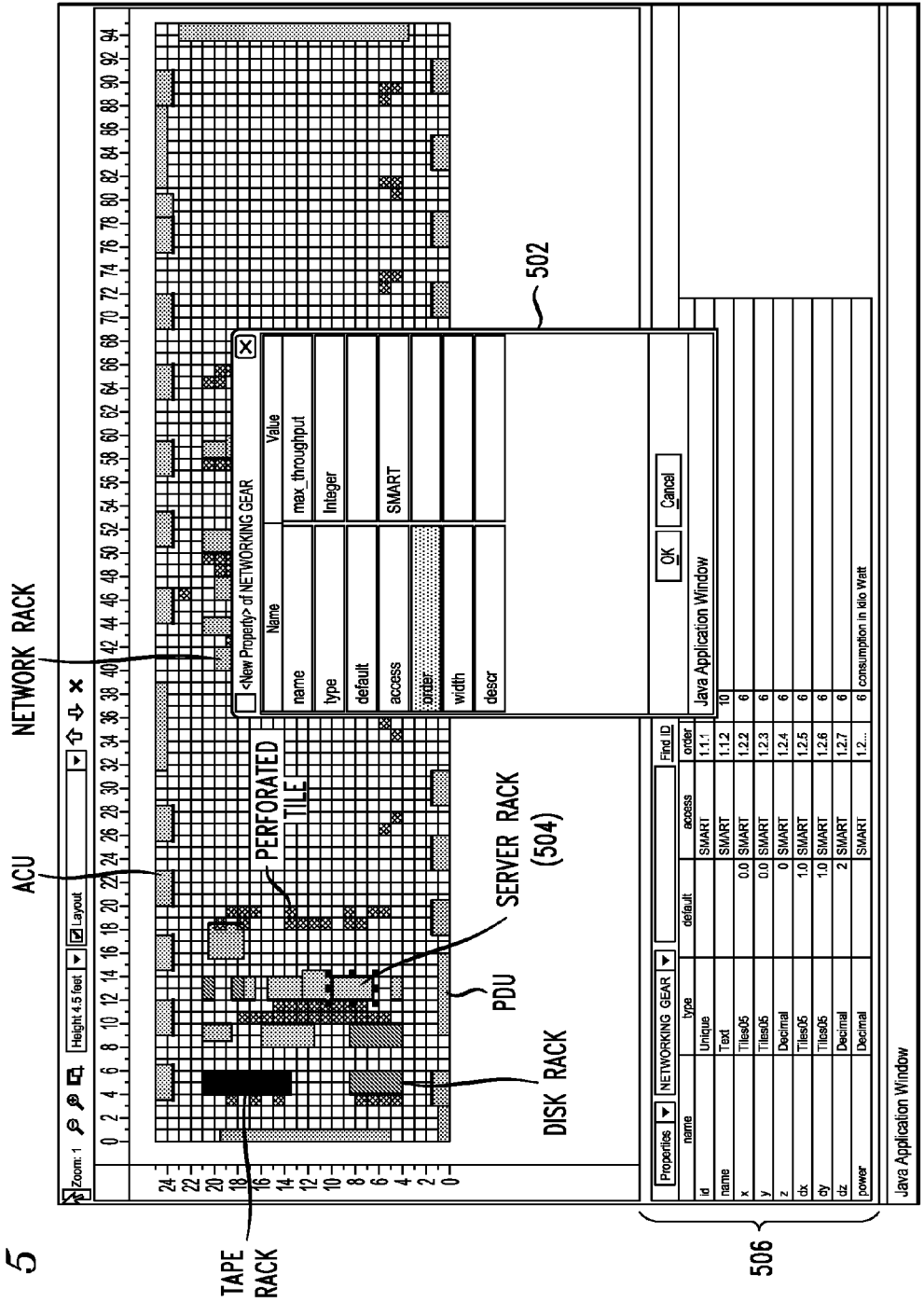
FIG. 5 is a diagram illustrating an exemplary graphical user interface displaying a representation of a data center according to an embodiment of the present invention.

FIG. 5 is a diagram illustrating exemplary graphical user interface 500 displaying a representation of a data center. As shown in FIG. 5, additional properties can be added to NETWORKING GEAR (in this case a server rack 504), e.g., by way of a user-accessible window 502 (the properties are updated for each type, i.e., it is different for each type). Table 506 at the bottom of FIG. 5 shows the properties (each row shows a new property) for the type: NETWORKING GEAR. The order specifies where the particular property being defined is shown in the table (second row, fourth row etc.). In turn it would be possible to create sub-types of the NETWORKING GEAR type (for example a sub-type called ROUTER). In addition, the data model builder component may allow the user to interactively define an xml schema for the physical systems, as shown in the sample MMT implementation code provided in the computer program listing appendix.

Figure 6:
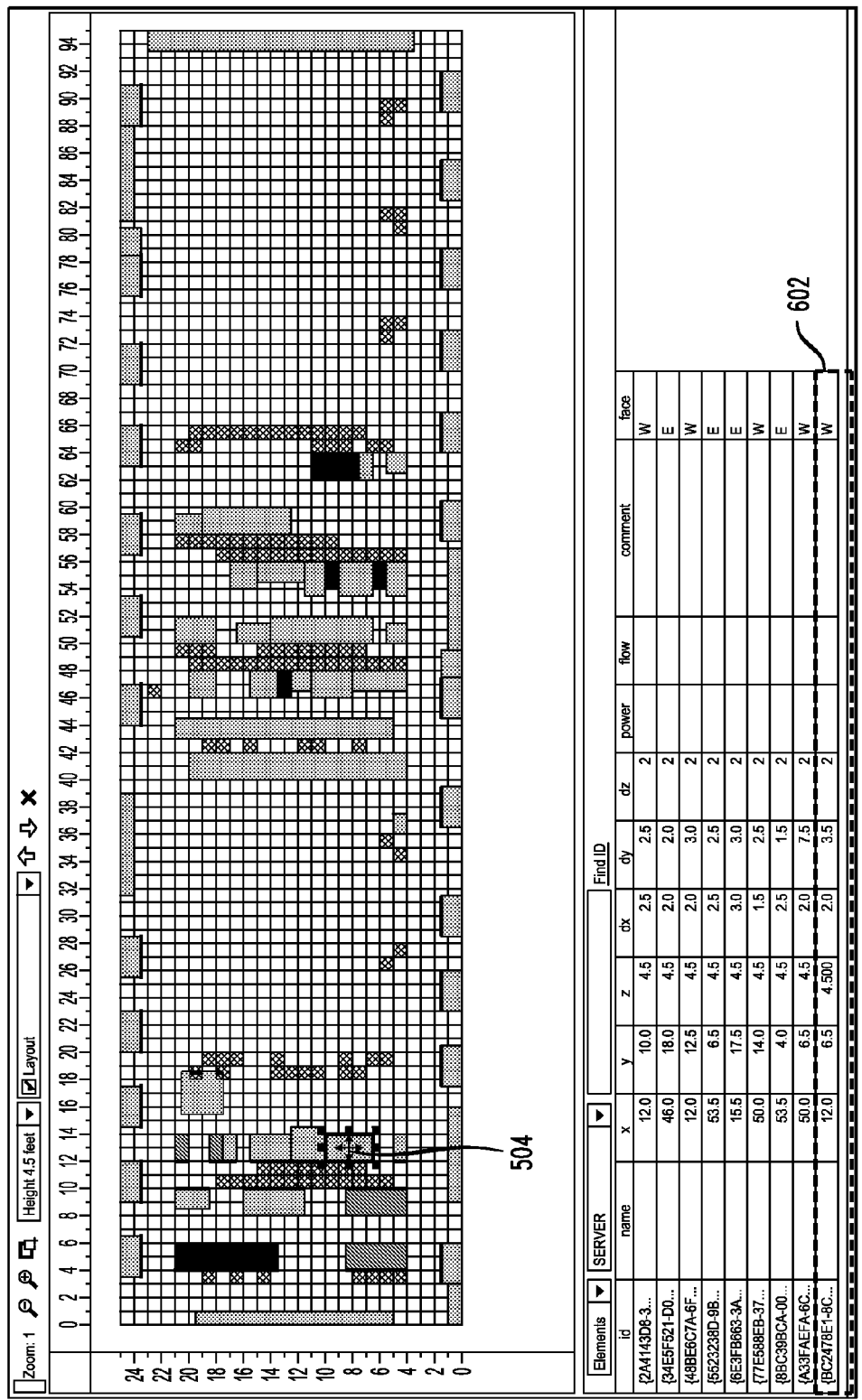
FIG. 6 is a diagram illustrating an exemplary graphical user interface displaying a representation of the data center (same view as in FIG. 5) showing an implementation of a model manager according to an embodiment of the present invention.

An exemplary use of the model manager is now provided. FIG. 6 is a diagram illustrating exemplary graphical user interface 600 displaying a representation of the data center (same view as in FIG. 5) showing an implementation of the model manager. Namely, the user has selected server rack 504 and can drag the server to another location in the data center, resize it (i.e., change its dimensions), or using text entry into the associated row in the table at the bottom of the screen, manually modify any attributes of the server. The bottom row, i.e., within box 602, corresponds to the selected server rack (server rack 504) in the top data center view (whenever an element is selected on the screen it will be highlighted in the table, or vice versa whenever an element is selected in the table it will be highlighted on the spatial map).

Figure 7:
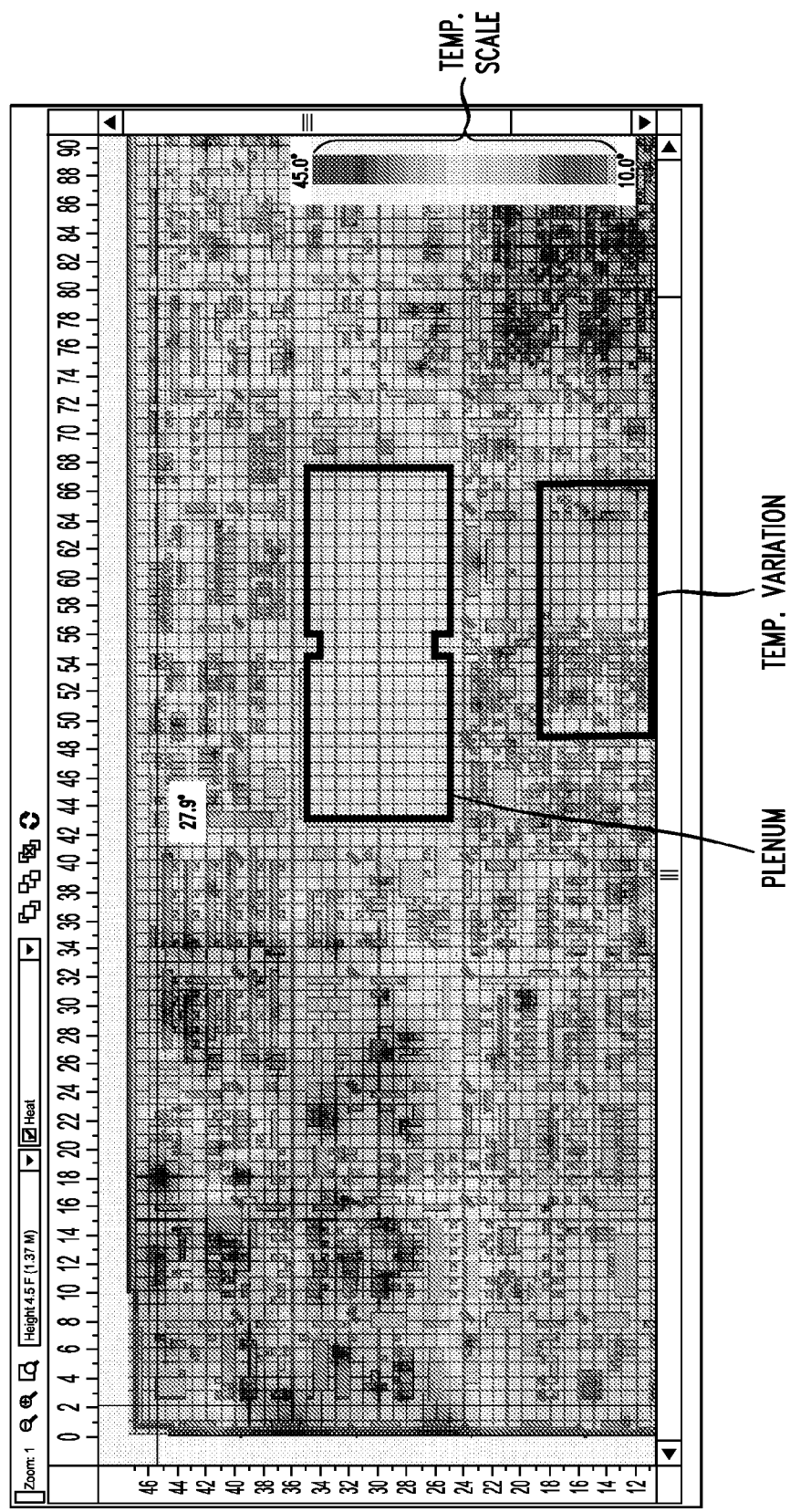
FIGS. 7-9 are a series of images illustrating the evolution of heat in a data center based on a real time feed of temperature data into the MMT platform according to an embodiment of the present invention.
Figure 8:
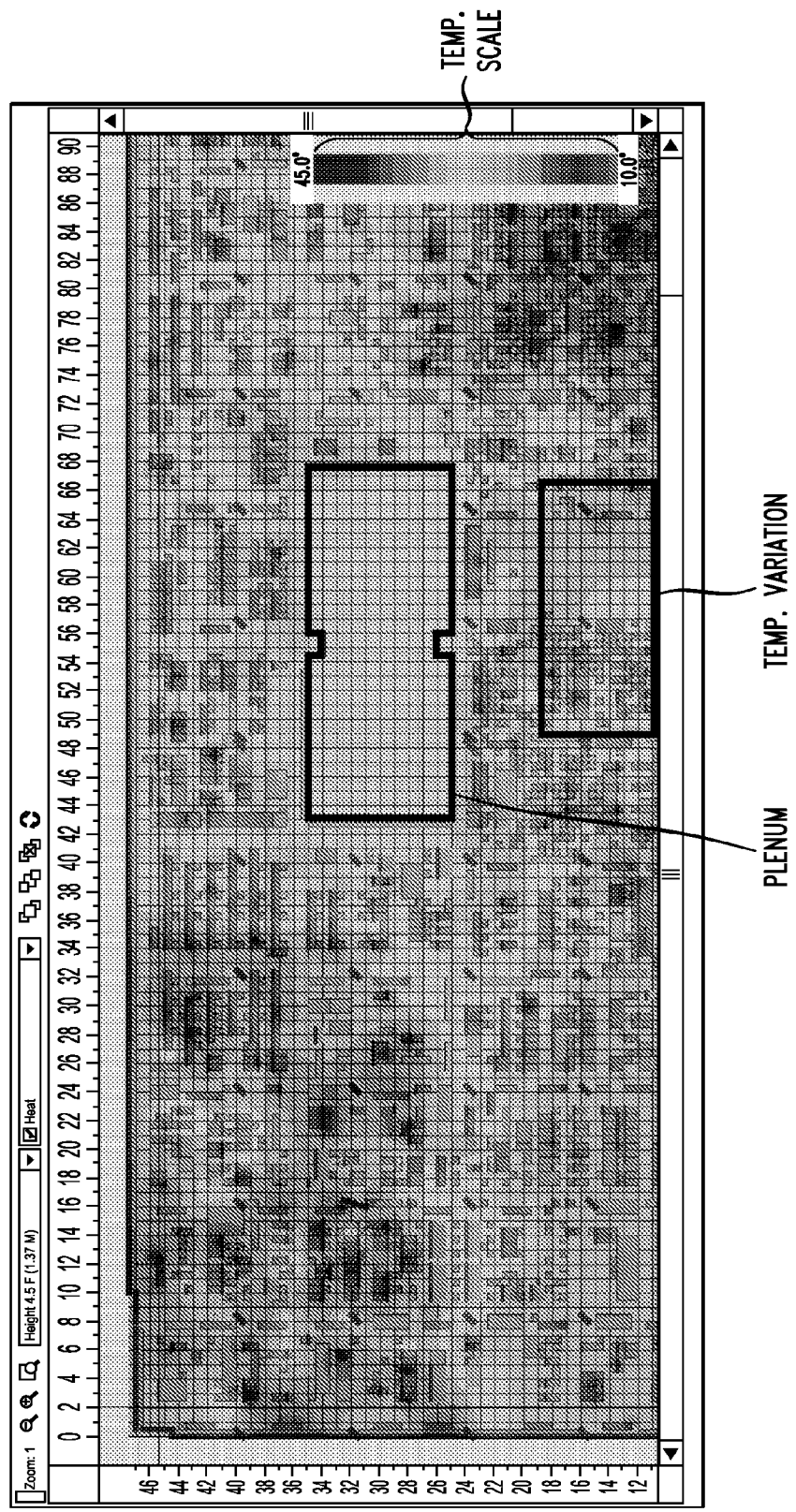
Figure 9:
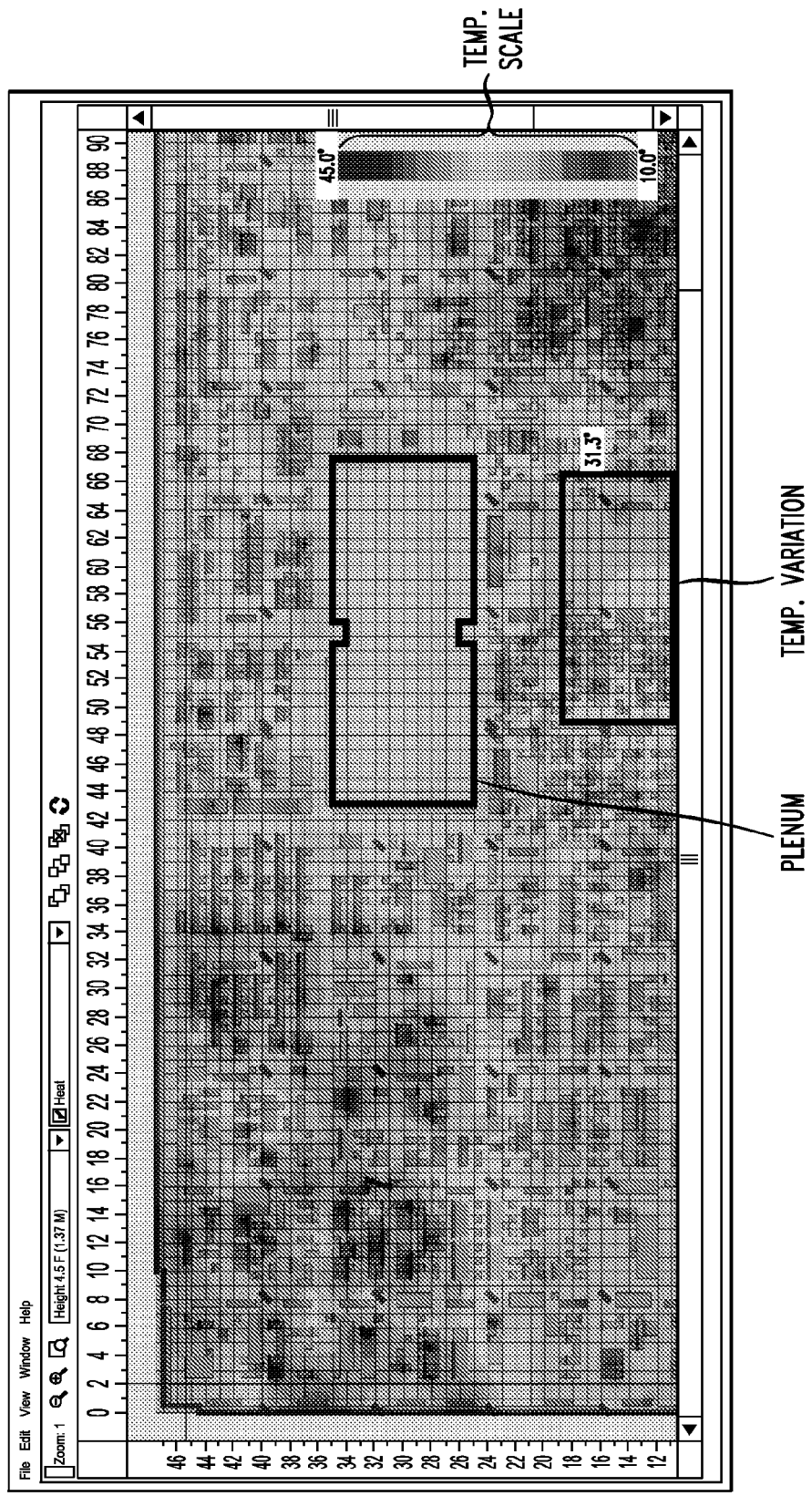

An exemplary use of the real time data manager is now provided. FIGS. 7-9 are a series of images 700-900, respectively, illustrating the evolution of heat in a data center (a different data center from, e.g., FIGS. 5 and 6, is depicted), based on a real time feed of temperature data into the MMT platform from deployed sensors. The different elements of the data center are visible in the images. A temperature scale is provided to the right of each image. The images are taken, i.e., created from the real time data. In addition the actual sensor value can be displayed next to the sensor element as is done, e.g., in FIG. 12, described below. The properties of a given element can be updated by the real time data, and the user can select a given element to see if the properties have changed. For example the user can go to the thermal sensor type and look at the properties and find different temperatures as values. The images are taken at 15 minute increments, so the changes are slight (indications of a region experiencing some variation is labeled "temp. variation"). By way of example only, there may be temperature changes in regions throughout the data center over time. These changes can be highlighted by the present MMT platform via the control manager, which may include alarm services etc. For example if a temperature goes over a certain threshold an e-mail can be sent to the user and/or highlighted as shown for example in FIG. 13, described below.

Figure 10:
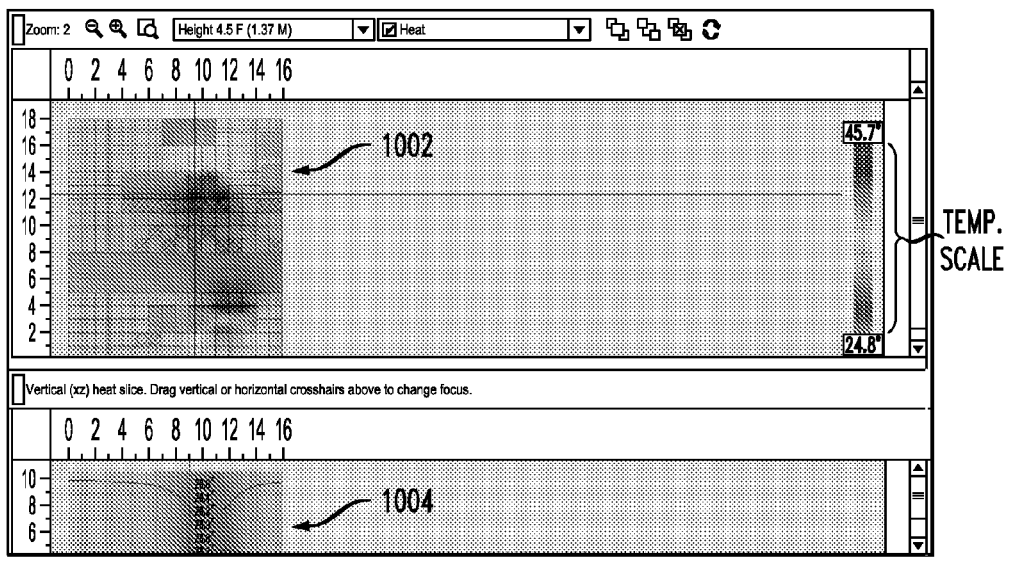
FIG. 10 is a diagram illustrating a heat distribution in a data center generated by a post-processing manager using the MMT platform according to an embodiment of the present invention.

An exemplary use of the post-processing manager is now provided. FIG. 10 is a diagram illustrating a heat distribution in a data center generated by a post-processing manager using the MMT platform (a different data center from, e.g., FIGS. 5 and 6, is depicted). Two images 1002 and 1004 are shown. In image 1002, the heat distribution along a horizontal slice in the xy-plane (see, for example, FIG. 2) taken at a height of 4.5 feet is given, while in image 1004, a vertical slice in the xz-plane (see, for example, FIG. 2) is given. The different elements of the data center are visible in image 1002. A temperature scale is provided to the right of image 1002.

Figure 11:
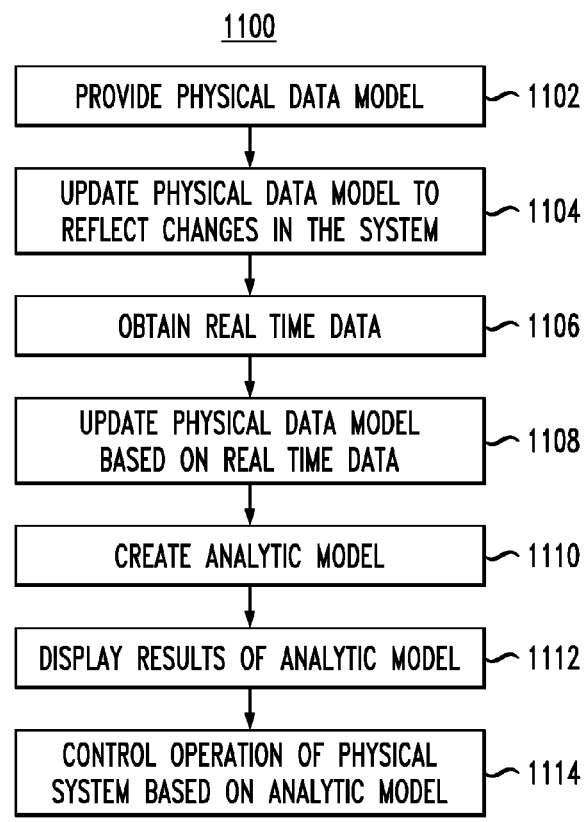
FIG. 11 is a diagram illustrating an exemplary methodology for monitoring, modeling and managing a physical system according to an embodiment of the present invention.

Based on the above description of the MMT platform, FIG. 11 is a diagram illustrating exemplary methodology 1100 for monitoring, modeling and managing, a physical system. In step 1102, a data model of the physical system, e.g., a data center, is provided. As highlighted above, the data model of the physical system (also referred to herein as "the physical data model") can be built dynamically by a user via the data model builder. In step 1104, the physical data model can be updated (for example, by the user) to reflect changes in the physical system. As highlighted above, these updates can be made by way of the model manager in response to, e.g., a server rack being added to a data center. In step 1106, real time (or near real time) data is obtained from the physical system. As highlighted above, the real time data can be obtained by the real time data manager via a feeder or agent. In step 1108, the physical data model is updated based on the real time data. As highlighted above, this change in the physical model can be effectuated by the model manager.

In step 1110, an analytic model(s) of the physical system is created based on the updated physical data model. As highlighted above, such an analytic (e.g., physics-based or statistical) model can be created by the analytic model manager. In step 1112, results (output) of the analytic model are displayed, e.g., so as to be viewed by the user. As highlighted above, visualization of the analytic model results can occur via the post-processing manager. In step 1114, operation of the physical system is controlled based on the output from the analytic model. As highlighted above, this function can be performed by the control manager in a number of different ways. First, the control manager can simply alert the user of conditions in the physical system, such as temperature hotspots in a data center, that become apparent based on the output of running the analytic model. Second, the control manager can directly control operation of the physical system in accordance with the output of the analytic model, e.g., by controlling the properties of one or more elements (see example regarding fan speed above). Third, the control manager can recommend control actions, such as changing fan speed, to the user in accordance with the output of the analytic model.

Figure 12:
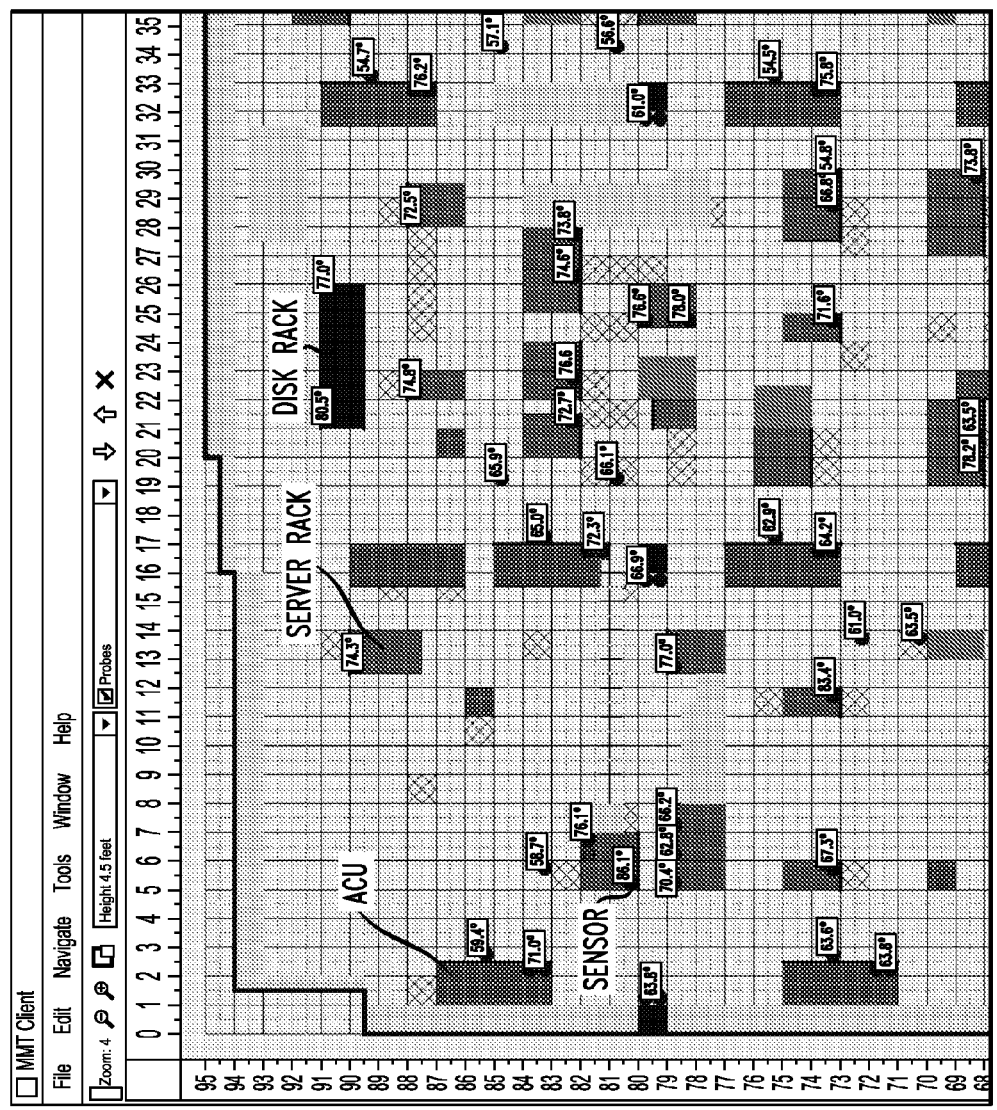
FIG. 12 is a diagram illustrating an exemplary graphical user interface for displaying a representation of a data center with a latest value of real time data displayed next to a corresponding sensor according to an embodiment of the present invention.

FIG. 12 is a diagram illustrating exemplary graphical user interface 1200 for displaying a representation of a data center with the latest value of the real time data displayed next to a corresponding sensor (which has provided the real time data). According to an exemplary embodiment, the real time data shown represents the latest acquired values.

Figure 13:
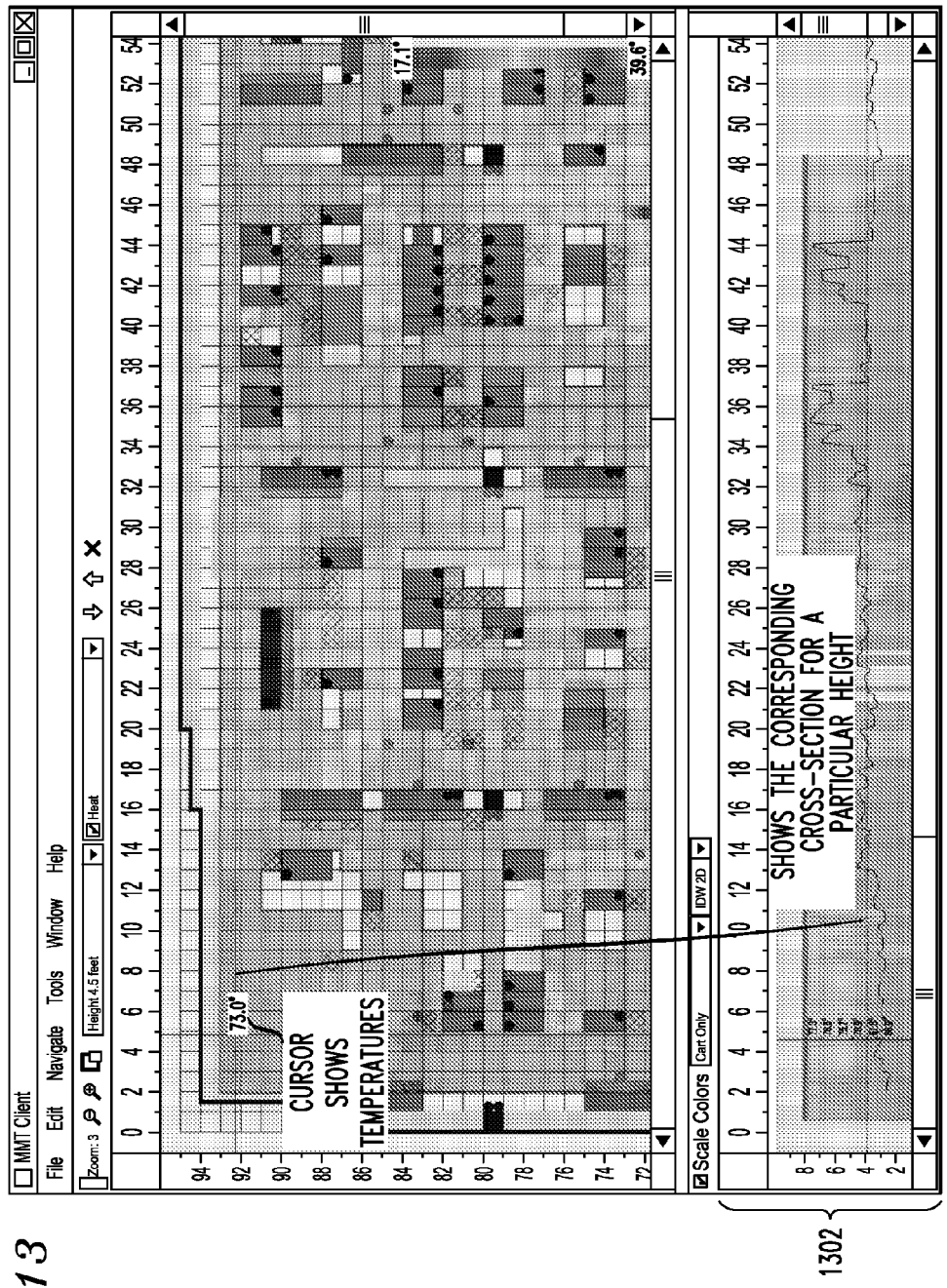
FIG. 13 is a diagram illustrating an exemplary graphical user interface displaying a representation of a data center highlighting a temperature value(s) corresponding to a location of a cursor according to an embodiment of the present invention.

FIG. 13 is a diagram illustrating exemplary graphical user interface 1300 displaying a representation of a data center highlighting a temperature value(s) corresponding to a location of the cursor. Chart 1302 at the bottom shows the corresponding cross-section for a particular height.

Figure 14:
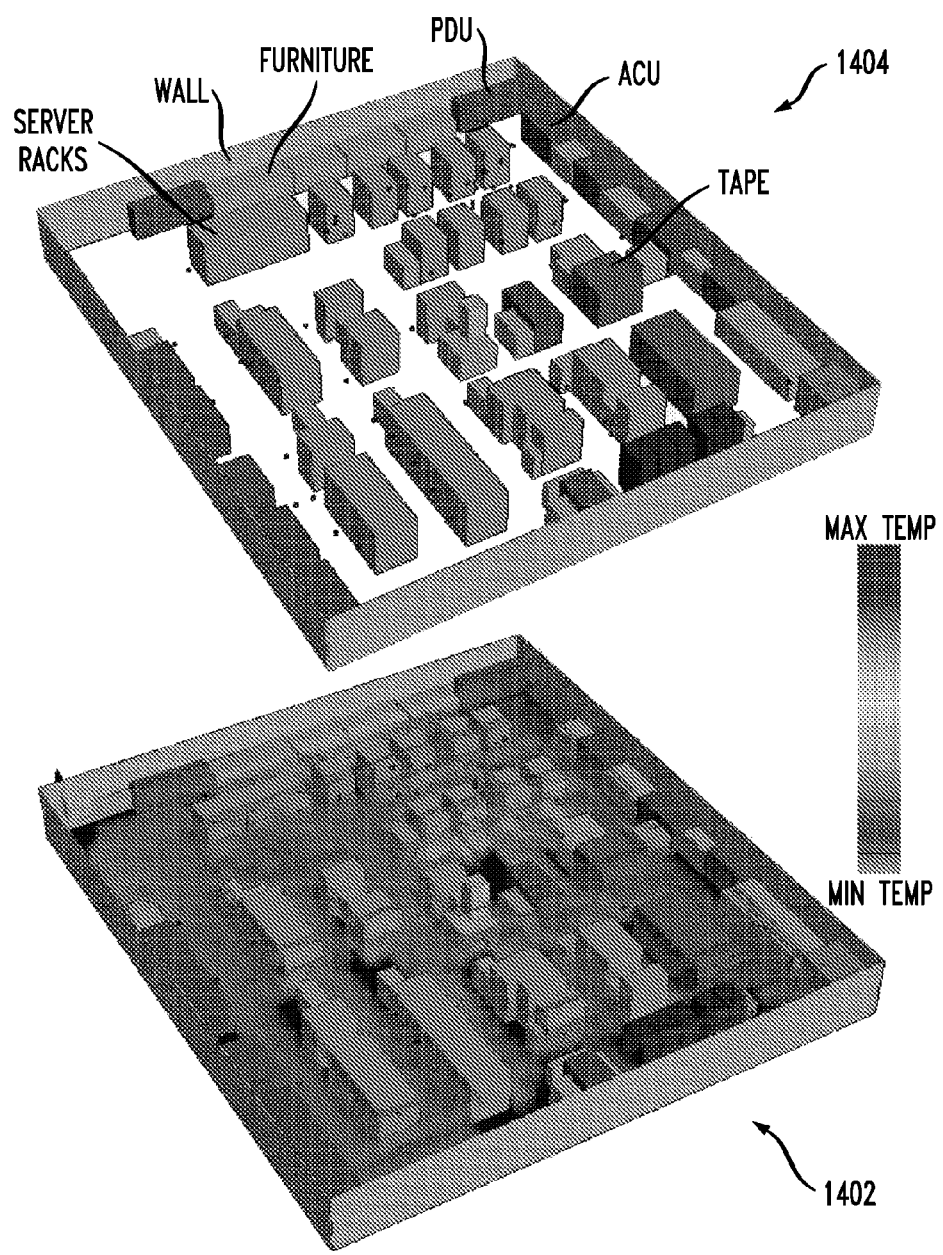
FIG. 14 is a diagram illustrating an exemplary embodiment for displaying three-dimensional cross-sections of a physical system according to an embodiment of the present invention.

FIG. 14 is a diagram illustrating one exemplary embodiment for displaying three-dimensional cross-sections of the physical system. Simple code is used in this example to translate the MMT data model 1402 to the VMRL data model 1404.

Figure 15:
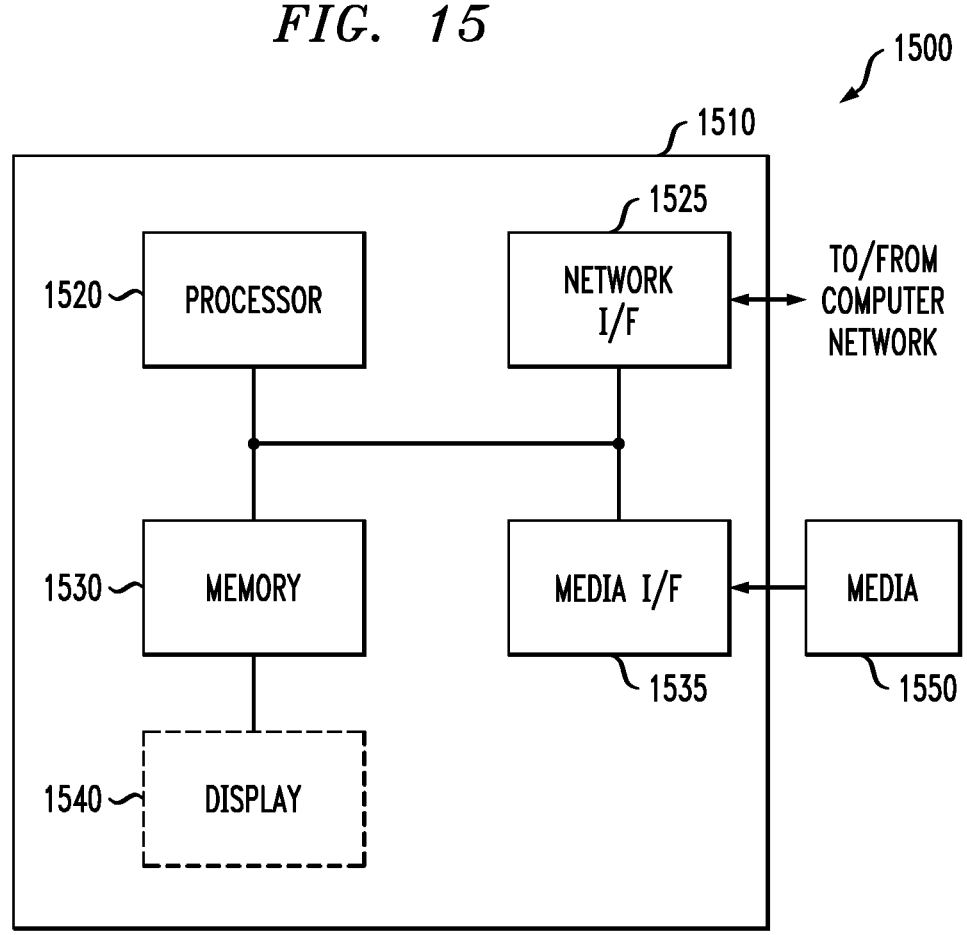
FIG. 15 is a diagram illustrating an exemplary apparatus for monitoring, modeling and managing a physical system according to an embodiment of the present invention.

Turning now to FIG. 15, a block diagram is shown of an apparatus 1500 for monitoring, modeling and managing a physical system, in accordance with one embodiment of the present invention. It should be understood that apparatus 1500 represents one embodiment for implementing methodology 1100 of FIG. 11.

Apparatus 1500 comprises a computer system 1510 and removable media 1550. Computer system 1510 comprises a processor device 1520, a network interface 1525, a memory 1530, a media interface 1535 and an optional display 1540. Network interface 1525 allows computer system 1510 to connect to a network, while media interface 1535 allows computer system 1510 to interact with media, such as a hard drive or removable media 1550.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to provide a physical data model of the physical system; obtain real time data from the physical system; update the physical data model based on the real time data; create an analytic model of the physical system based on the updated physical data model; and control operation of the physical system based on output from the analytic model.

The machine-readable medium may be a recordable medium (e.g., floppy disks, hard drive, optical disks such as removable media 1550, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1520 can be configured to implement the methods, steps, and functions disclosed herein. The memory 1530 could be distributed or local and the processor 1520 could be distributed or singular. The memory 1530 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1520. With this definition, information on a network, accessible through network interface 1525, is still within memory 1530 because the processor device 1520 can retrieve the information from the network. It should be noted that each distributed processor that makes up processor device 1520 generally contains its own addressable memory space. It should also be noted that some or all of computer system 1510 can be incorporated into an application-specific or general-use integrated circuit.

Optional video display 1540 is any type of video display suitable for interacting with a human user of apparatus 1500. Generally, video display 1540 is a computer monitor or other similar video display.

As highlighted above, the data model builder component may allow the user to interactively define an xml schema for the physical systems. A sample of such MMT implementation code is provided in the computer program listing appendix.

The schema provided in the computer program listing appendix may be built interactively using the MMT Client application or by hand using any XML editor.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for monitoring, modeling and managing a physical system, comprising the steps of:
    providing a physical data model of the physical system, wherein the physical data model, which is built by a user, contains one or more elements, wherein each of the elements represents a particular physical object in the physical system, and at least one of the elements, its physical location in the physical data model, and its attributes are specified by the user from a hierarchy of data types wherein each of the elements is associated with a data type and the hierarchy of data types comprises at least one data type and at least one data sub-type, and in the hierarchy of data types at least a given one of the data types serves as a data sub-type for a given one or more other of the data types, wherein one or more of the elements are sensors, and wherein a number and a location of the sensors in the physical data model are specified by the user;
    obtaining real time data from the physical system from the sensors;
    updating the physical data model based on the real time data to create an updated physical data model and wherein the user can select a given one of the elements in the updated physical data model to see if properties of the given element have changed;
    creating an analytic model of the physical system based on the updated physical data model; and
    controlling operation of the physical system based on output from the analytic model,
    wherein the analytic model is based on a measurement based dynamic modeling architecture such that one or more base models are generated from an initial survey which serve as input for creating one or more updated base models and one or more dynamic models, wherein the dynamic models are created more frequently than that updated base models and the updated base models are created more frequently than the base models, and wherein the updated base models and the dynamic models use the real time data obtained from the sensors.

2. The method of claim 1, wherein the physical system comprises a data center.

3. The method of claim 1, wherein the physical data model comprises attributes associated with the elements.

4. The method of claim 1, further comprising the step of:
    building the physical data model of the physical system.

5. The method of claim 4, wherein the step of building the physical data model is performed by the user.

6. The method of claim 1, further comprising the step of:
    updating the physical data model to reflect changes in the physical system.

7. The method of claim 6, wherein the step of updating the physical data model is performed by the user.

8. The method of claim 1, wherein the analytic model comprises a physics-based model or a statistical model.

9. The method of claim 1, further comprising the step of:
    displaying the analytic model results.

10. The method of claim 1, wherein the step of controlling operation of the physical system further comprises the step of:
    alerting the user of the output from the analytic model using a notification sent by one or more of e-mail and instant messaging.

11. The method of claim 1, wherein the step of controlling operation of the physical system further comprises the step of:
    directly controlling operation of the physical system based on output from the analytic model.

12. The method of claim 1, wherein the step of controlling operation of the physical system further comprises the step of:
    recommending control actions based on output from the analytic model.

13. An article of manufacture for monitoring, modeling and managing a physical system, comprising a machine-readable medium containing one or more programs which when executed implement the steps of the method according to claim 1.

14. A platform for monitoring, modeling and managing a physical system, comprising:
    a data model builder configured to build a data model of the physical system wherein the physical data model, which is built by a user, contains one or more elements, wherein each of the elements represents a particular physical object in the physical system, and at least one of the elements, its physical location in the physical data model, and its attributes are specified by the user from a hierarchy of data types wherein each of the elements is associated with a data type and the hierarchy of data types comprises at least one data type and at least one data sub-type, and in the hierarchy of data types at least a given one of the data types serves as a data sub-type for a given one or more other of the data types, wherein one or more of the elements are sensors, and wherein a number and a location of the sensors in the physical data model are specified by the user;
    a real time data manager configured to obtain real time data from the physical system from the sensors;
    a physical model manager configured to update the model based on the real time data to create an updated physical data model and wherein the user can select a given one of the elements in the updated physical data model to see if properties of the given element have changed;
    an analytic model manager configured to create an analytic model of the physical system based on the updated data model; and
    a control manager configured to control operation of the physical system based on output from the analytic model,
    wherein the analytic model is based on a measurement based dynamic modeling architecture such that one or more base models are generated from an initial survey which serve as input for creating one or more updated base models and one or more dynamic models, wherein the dynamic models are created more frequently than that updated base models and the updated base models are created more frequently than the base models, and wherein the updated base models and the dynamic models use the real time data obtained from the sensors.

15. The platform of claim 14, further comprising:
    a post-processing manager configured to display the analytic model results.

16. An apparatus for modeling thermal zones in a space, the apparatus comprising:
    a memory; and
    at least one processor device, coupled to the memory, operative to:
    provide a physical data model of the physical system wherein the physical data model, which is built by a user, contains one or more elements, wherein each of the elements represents a particular physical object in the physical system, and at least one of the elements, its physical location in the physical data model, and its attributes are specified by the user from a hierarchy of data types wherein each of the elements is associated with a data type and the hierarchy of data types comprises at least one data type and at least one data sub-type, and in the hierarchy of data types at least a given one of the data types serves as a data sub-type for a given one or more other of the data types, wherein one or more of the elements are sensors, and wherein a number and a location of the sensors in the physical data model are specified by the user;

obtain real time data from the physical system from the sensors;

update the physical data model based on the real time data to create an updated physical data model and wherein the user can select a given one of the elements in the updated physical data model to see if properties of the given element have changed;

create an analytic model of the physical system based on the updated physical data model; and control operation of the physical system based on output from the analytic model, wherein the analytic model is based on a measurement based dynamic modeling architecture such that one or more base models are generated from an initial survey which serve as input for creating one or more updated base models and one or more dynamic models, wherein the dynamic models are created more frequently than that updated base models and the updated base models are created more frequently than the base models, and wherein the updated base models and the dynamic models use the real time data obtained from the sensors.

17. The apparatus of claim 16, wherein the at least one processor device is further operative to:
    alert the user of the output from the analytic model using a notification sent by one or more of e-mail and instant messaging.

18. The apparatus of claim 16, wherein the at least one processor device is further operative to:
    directly control operation of the physical system based on output from the analytic model.

19. The apparatus of claim 16, wherein the at least one processor device is further operative to:
    recommend control actions based on output from the analytic model.

* * * * *